Figure 1:
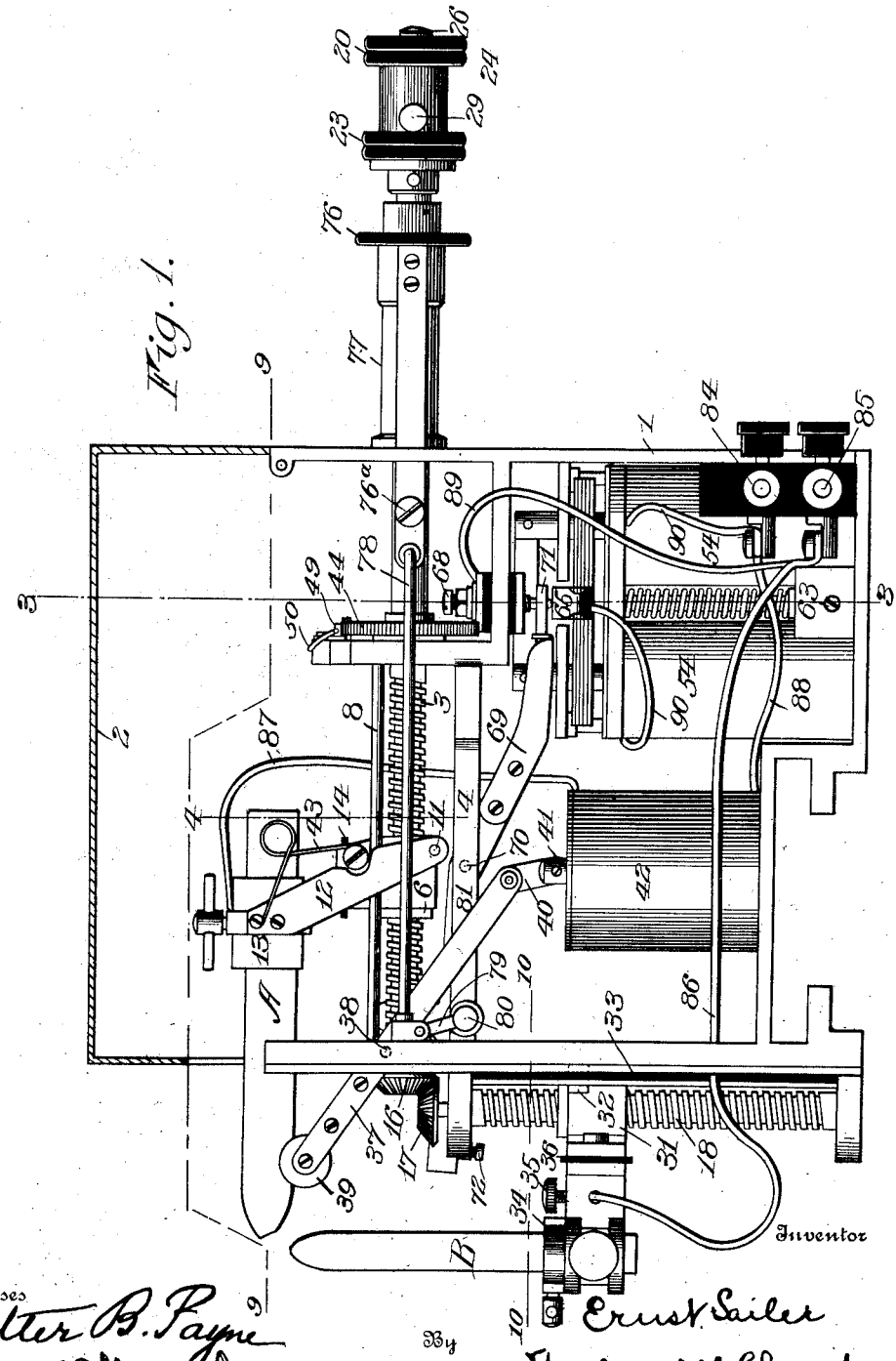

E. SAILER.
AUTOMATIC ARC LAMP.
APPLICATION FILED NOV. 3, 1905.

981,121.

Patented Jan. 10, 1911.
6 SHEETS—SHEET 1.

Witnesses
Walter B. Payne
Russell B. Griffith

Inventor
Ernst Sailer
By
Frederick H. Church
his Attorney

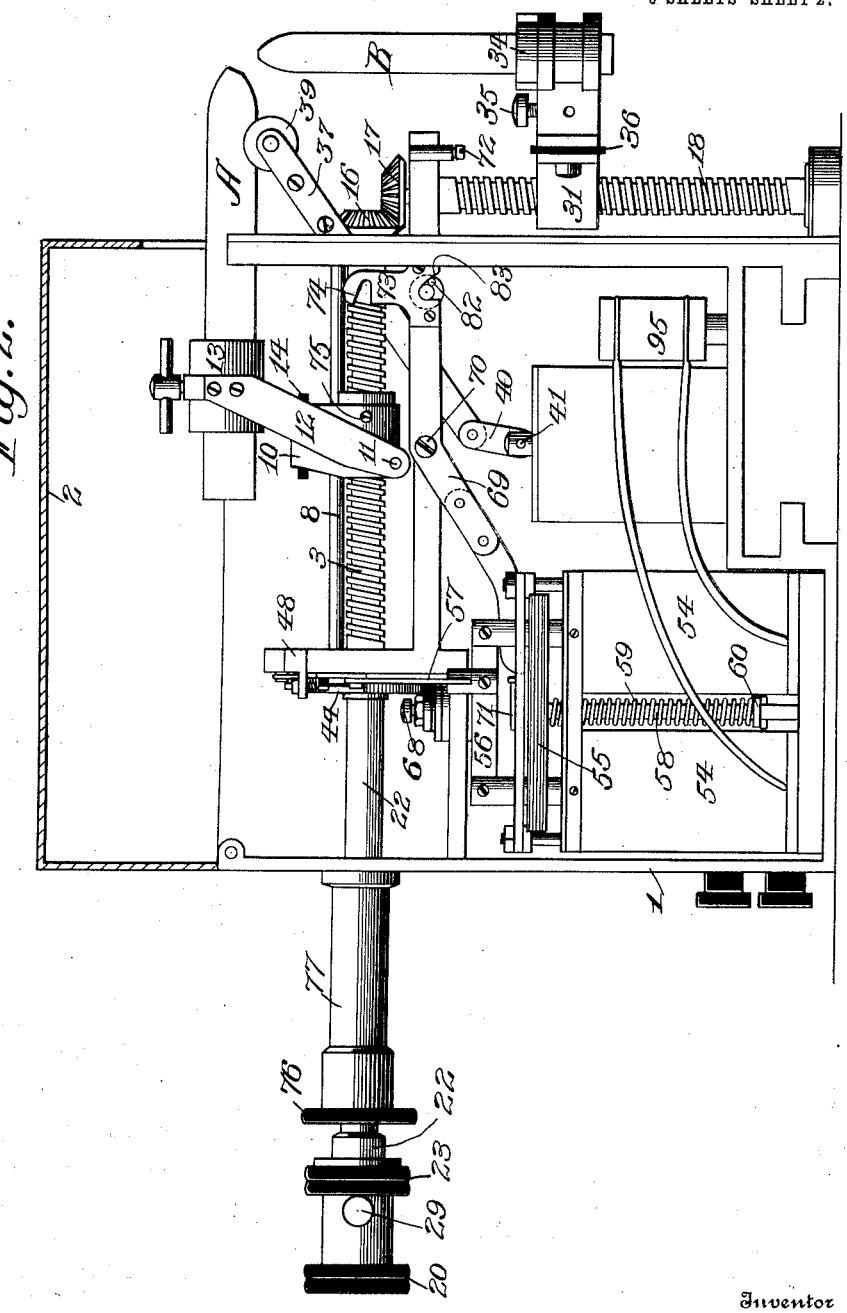

E. SAILER.
AUTOMATIC ARC LAMP.
APPLICATION FILED NOV. 3, 1905.
981,121.
Patented Jan. 10, 1911.
6 SHEETS—SHEET 3.
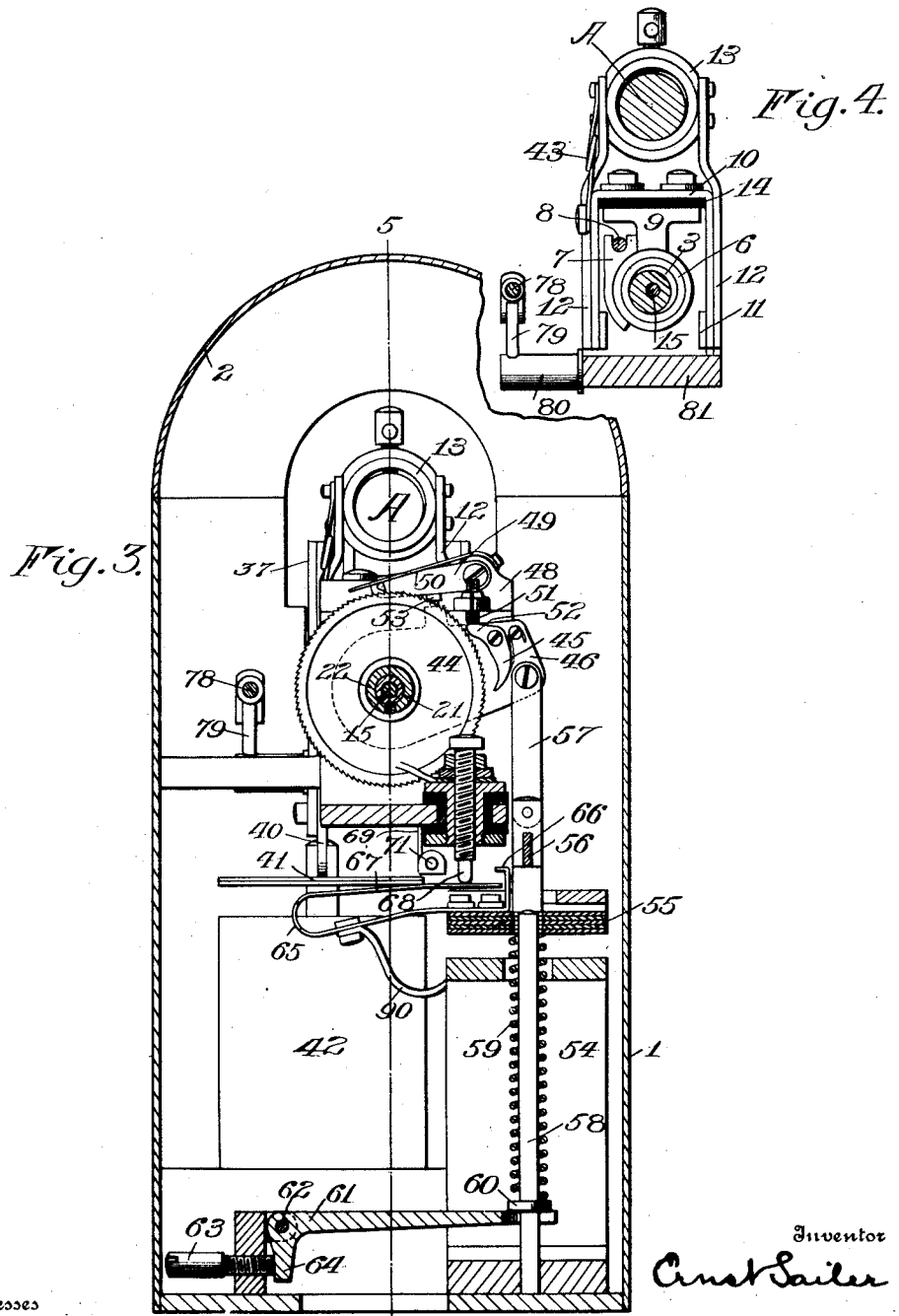

E. SAILER.
AUTOMATIC ARC LAMP.
APPLICATION FILED NOV. 3, 1905.
981,121.
Patented Jan. 10, 1911.
6 SHEETS—SHEET 4.
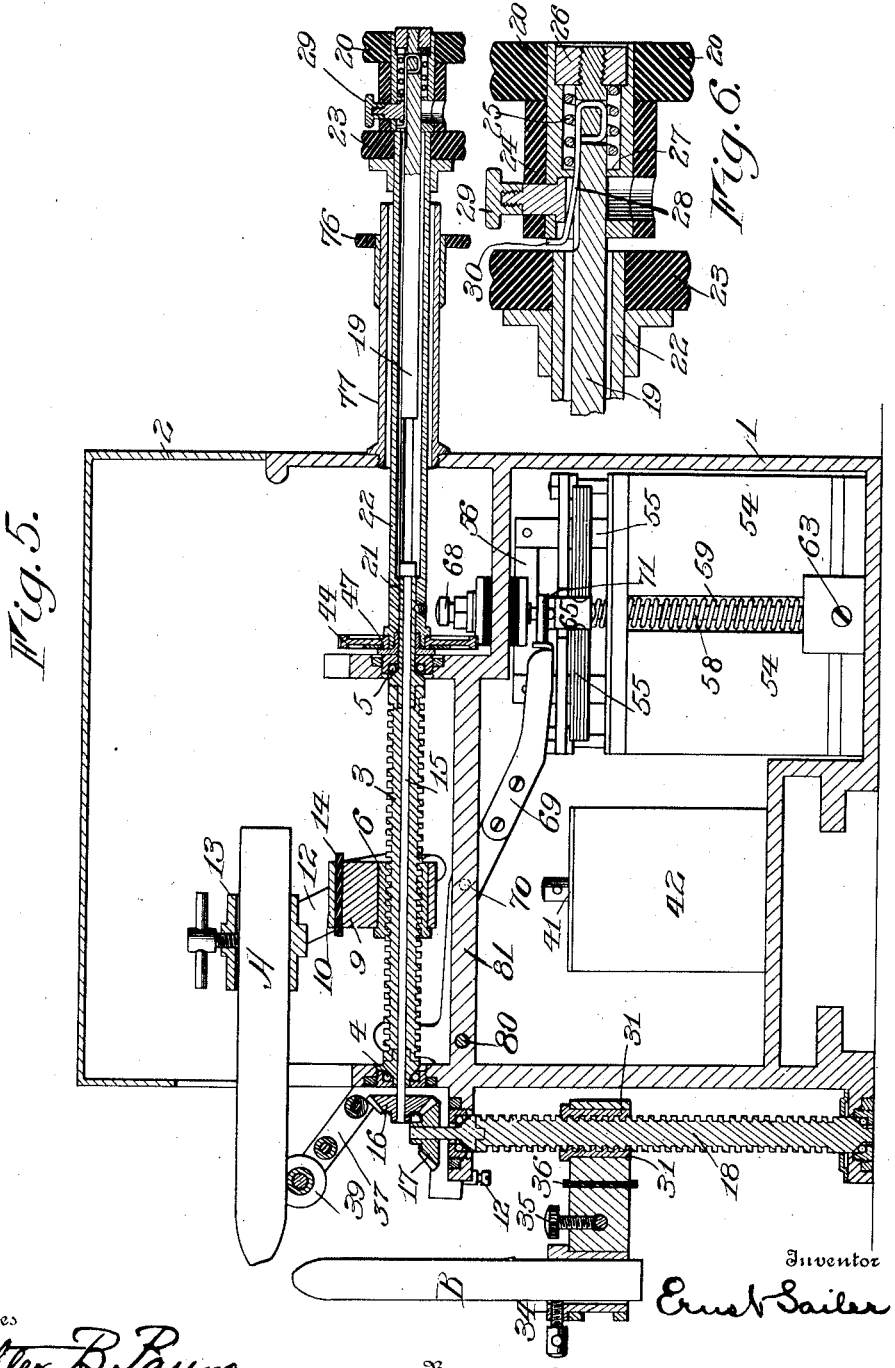

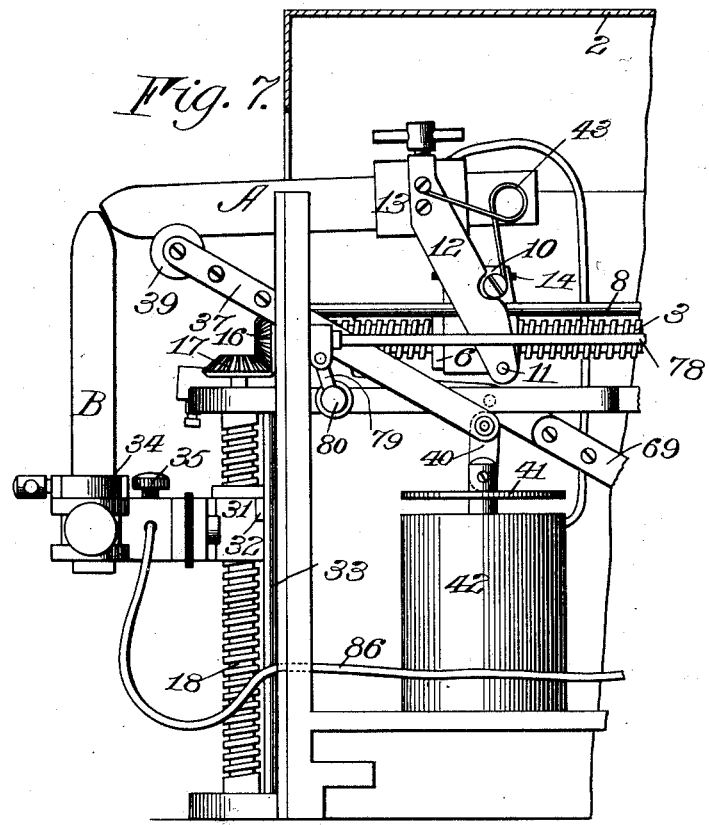

E. SAILER.
AUTOMATIC ARC LAMP.
APPLICATION FILED NOV. 3, 1905.
981,121.
Patented Jan. 10, 1911.
6 SHEETS—SHEET 6.
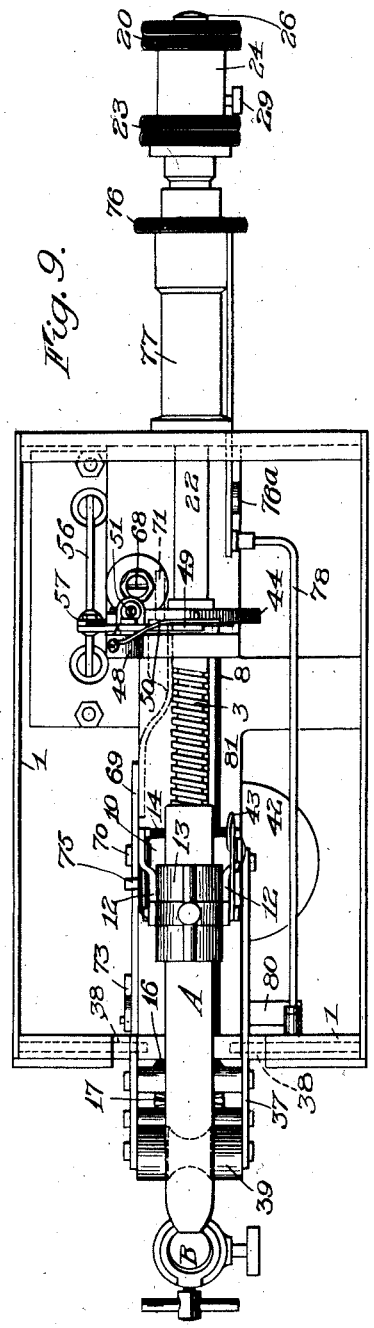
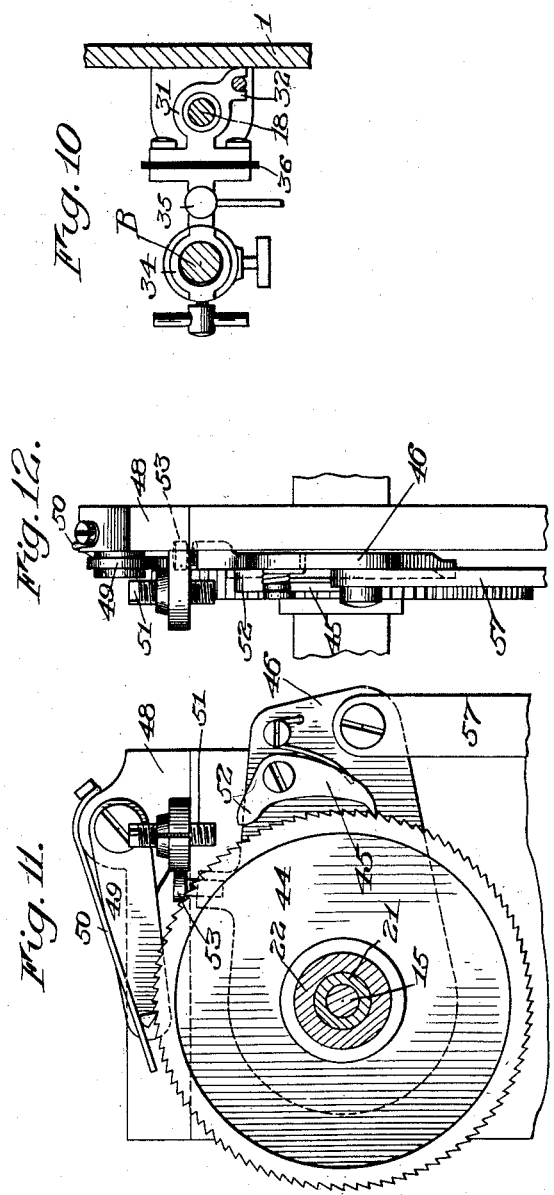
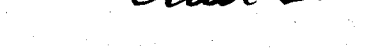

UNITED STATES PATENT OFFICE.

ERNST SAILER, OF ROCHESTER, NEW YORK, ASSIGNOR, BY MESNE ASSIGNMENTS, TO BAUSCH & LOMB OPTICAL COMPANY, OF ROCHESTER, NEW YORK, A CORPORATION OF NEW YORK, (No. 2.)

AUTOMATIC ARC-LAMP.

981,121.   Specification of Letters Patent.   Patented Jan. 10, 1911.

Application filed November 3, 1905. Serial No. 285,687.

*To all whom it may concern:*

Be it known that I, ERNST SAILER, of Rochester, in the county of Monroe and State of New York, have invented certain new and useful Improvements in Automatic Arc-Lamps; and I do hereby declare the following to be a full, clear, and exact description of the same, reference being had to the accompanying drawings, forming a part of this specification, and to the reference-numerals marked thereon.

The present invention relates to improvements in electric arc lamps, and the purpose of the invention is to provide an improved device of this kind having improved carbon regulating and adjusting mechanism whereby the electrodes may be operated either automatically or manually adjusted and controlled for the purpose of setting and maintaining them in proper relative positions to sustain the luminous arc between them, an automatic arc-controlling device being provided to coöperate with the regulating mechanism for establishing the arc after the electrodes have been adjusted either by the automatic or manually controlled mechanism.

To these and other ends the invention consists in certain improvements and combinations of parts all as will be hereinafter more fully explained, the novel features being pointed out in the claims at the end of the specification.

In the drawing: Figure 1 represents a side elevation of an electric arc lamp constructed in accordance with my invention, a portion of the casing thereof being removed to show the regulating and controlling mechanism. Fig. 2 is a view similar to Fig. 1, the view being taken from the opposite side of the lamp. Fig. 3 represents a transverse section of the lamp on the line 3—3 of Fig. 1. Fig. 4 represents a section on the line 4—4 of Fig. 1. Fig. 5 represents a longitudinal section of the lamp taken on the line 5—5 of Fig. 3. Fig. 6 is a section of the manually-operated carbon adjusting handles on an enlarged scale, the handles in this view being shown disconnected for independent operation. Fig. 7 shows the electrodes previous to separation to form the arc. Fig. 8 is a diagram showing how the electrical parts of the lamp are connected up. Figs. 9 and 10 are respectively sections on lines 9—9 and 10—10, Fig. 1, and Figs. 11 and 12, show respectively a front elevation and a side view of the ratchet wheel and its coöperating mechanisms.

My invention in its present form is shown as applied to a lamp of the kind usually employed in connection with projection apparatus wherein it is essential that the light given off from the arc be sustained continuously and of uniform intensity, such a lamp comprising a substantially closed casing having a body portion 1 adapted for attachment to a base or support and formed to contain the regulating and controlling mechanism of the lamp, a hinged or removable cover 2 being preferably provided for the lamp to permit of the access to its interior.

Arranged horizontally within the casing is a carbon feed screw 3 having its ends journaled in the ball bearings 4 and 5 in the casing, and on this screw is mounted a carbon holder for the upper carbon A, comprising a sleeve 6 formed to coöperate with the screw and to travel longitudinally thereon, and a guide 7 on the sleeve to coöperate with the rod 8 extending parallel to the screw to guide the holder in its movements along the screw. On this sleeve is a bracket 9 to which the yoke 10 is secured, and to the arms of the latter at 11 are pivoted the swinging arms 12 the upper ends of which are secured by a clamp 13 to receive the carbon. It is preferable to insulate the carbon clamp from the remainder of the lamp, and this may be accomplished by interposing a strip of insulating material 14 between the bracket 9 and the yoke 10.

Extending loosely through an axial bore in the screw 3 is a shaft 15 having a bevel gear 16 at one end adapted to mesh with the corresponding gear 17 fixed to a second carbon feed screw 18, these screws being arranged in angular relation to the end that the crater of one of the carbons may be maintained constantly in a given line throughout the feeding and regulating operation, and the second carbon by moving in a relative angular path may be moved into and out of coöperative relation with it. The opposite end of the shaft 15 is provided with an extension 19 which projects outside of the lamp casing and is provided with an operating handle 20, while the screw 3 at its corresponding end is provided with a sleeve 21 having a second sleeve 22 fixed to it and also projecting outside of the lamp casing the second sleeve surrounding the extension 19 and having an operating handle 23. The handle 20 is connected to the carbon feed screw 18 through the shaft 15 and its extension 19 and through the bevel gears 16 and 17 which are arranged between the shaft and the said screw, while the operating handle 23 when operated independently of the handle 20 is capable of operating the carbon feed screw 3 through the connected sleeves 21 and 22. This arrangement enables either of the carbon operating screws to be adjusted independently of the other when operated by its respective handle, but it is sometimes desirable to operate both screws simultaneously when bringing the carbons together and separating them, and this is accomplished in the present instance by providing a device for connecting the handles 20 and 23 for simultaneous operation, and this is obtained in the present instance by mounting the handle 20 with provision for a movement thereof longitudinally of the extension 19 to bring the sleeve 24 thereon into and out of frictional engagement with a corresponding surface on the handle 23, a spring 25 being arranged between the shoulder 26 of the shaft extension and the shoulder 27 of the handle to retain the two handles in coöperative relation with sufficient pressure to cause the rotary motion of one to be imparted to the other. By providing a spring-actuated detent 28 on the extension 19 and a plunger 29 for operating it, the two handles may be held in disengaged position and consequently for independent adjustment by the engagement of the finger 30 of the detent with one end of the sleeve 24 of handle 20, pressure on the plunger 2 serving to disengage the detent and sleeve and permit the latter under action of the spring 25 to engage with the handle 23 the two normally controlled handles serving as members of a clutch.

The screw 18 is provided for operating the second carbon B, and the latter is mounted in a carbon holder comprising a sleeve 31 formed to operate on the screw and having the guiding arm 32 to coöperate with a guiding rod 33, and to this sleeve is attached the carbon clamp 34, a binding screw 35 being provided on a part of the clamp to receive the conductor for the electrode. This carbon clamp is insulated from the remainder of the lamp mechanism by means of a sheet of insulating material 36 which may be conveniently interposed between the clamp and the sleeve.

The motion of the carbon holder for the carbon B is in a direct line with its feed screw 18, but the holder for the carbon A not only moves in a direction longitudinally of its feed screw 3, but it is also capable of a swinging motion in the plane of the carbons about the pivots 11 as a center, and for the purpose of controlling the relative swinging motion of the carbons, I provide a controlling lever 37 pivoted to a relatively fixed portion of the casing at 38 and provided at one end with a roller 39 on which the carbon A rests, the opposite end of this lever being connected through the link 40, to the armature 41 of a magnet or solenoid 42 having a suitable winding. Ordinarily in starting the lamp into operation, the carbons A and B occupy the relative positions shown in Fig. 7, their points touching and the armature 41 being raised or drawn out of its solenoid coil, but in drawing or establishing the arc between the carbons, the lever 37 is tilted by the lowering of the armature 41 due to its attraction by the solenoid when energized, causing the roller 39 thereon to swing the carbon A in a plane about the pivots 11, and in this way separating the adjacent ends of the electrodes. A spring 43 is preferably employed between the carbon clamp 13 and the bracket of the upper carbon holder for holding the carbon A in coöperative relation with the roller 39 with sufficient force to tilt the controlling lever 37 and depress the armature 41 when the solenoid is deënergized, or the current flowing through it, falls below a given strength.

The automatic regulator for feeding the carbons together to compensate for the wasting action operates in conjunction with a ratchet wheel 44 which is fixed on the sleeve 22 and is normally connected to operate with the carbon operating screws 3 and 18 through the manually-controlled handles 20 and 23 so that rotation of this wheel will cause the simultaneous operation of the two carbon-operating screws. Coöperating with this ratchet wheel is a pawl 45 carried by an arm 46 which is journaled at 47 on the sleeve 21 so that it will move concentrically with the ratchet wheel, and on the relatively fixed support 48 is provided a latch 49 which is normally held in coöperative engagement with the ratchet wheel by the spring 50 to prevent retrograde motion thereof. On the support 48 is also provided an adjustable stop 51 which is arranged in the path of an arm 52 on the pawl 45 to disengage it from the ratchet wheel, while a stop 53 is provided on the arm 46 to coöperate with the latch 49 and thus, as the arm 46 is depressed, the pawl 45 and the latch 49 will coöperate with the ratchet wheel 44 to rotate it, but as this arm approaches the limit of its upward movement the arm 52 on the pawl 45 will encounter the stop 51, and this will cause the pawl to be disengaged from the ratchet wheel, while the stop 53 on the said arm will strike the latch 49 and disengage it from the ratchet wheel, and as the arm 46 normally occupies the upper position, as shown in Fig. 3, the ratchet wheel under normal conditions will be free from the pawl 45 and latch 49 so that it may rotate freely while the electrodes are being adjusted manually, the latch serving to hold the wheel only during the upward movement of the pawl 45. This arm 46 is adapted to be oscillated by suitable magnetically-controlled devices which comprise in the present instance the magnet 54 having an armature 55 coöperating therewith which is carried by a yoke 56, the latter being connected by the link 57 to the arm 46, a guiding rod 58 being provided having a compression spring 59 surrounding it and operating on the armature to normally hold the latter and also the arm 46 in elevated position. The lower end of this spring bears against a shoulder 60, in turn being operated on by an arm of the bell crank 61 pivoted at 62 to a relatively fixed part of the casing and provided with an adjusting screw 63 which operates on the arm 64 thereof for the purpose of adjusting the delicacy of the regulation by varying the degree of compression on the spring 59. This armature is adapted to operate a circuit controller or interrupter, which comprises in the present instance a spring 65 having a bracket portion 66 thereon secured to and movable with the armature, the spring being doubled to form a free arm 67 arranged to coöperate with an adjustable contact member 68 secured to a relatively fixed part of the casing, the spring arm 67 remaining in contact with this member 68 until the armature approaches the lower limit of its motion, when the bracket 66 will coöperate with it to disengage it from the contact member 68. This will momentarily interrupt the current through the magnet 54 and allow its armature 55 to rise under the action of the spring 59 the arm 46 being also returned to normal position with the armature, as shown in Fig. 3, the pawl 45 and latch 49 disengaging from the ratchet wheel. Through this circuit controller, the current for operating the automatic regulation passes and is controlled, and it is preferable to provide suitable stop motion for interrupting the feeding motion of the carbons, as for instance when they reach the limit of their travel, and in the present instance I employ a device which will operate automatically as well as under manual control, and this device comprises generally a lever 69 pivoted to a relatively fixed part of the casing at 70 and having an extension 71 at one end adapted to coöperate with the spring arm 67 of the circuit controller in such a way that when it is depressed, it will disengage the spring arm from the contact 68 to break the circuit therethrough. The opposite end of this lever is provided with an adjustable projection 72 arranged in the path of the carbon holder for carbon B, while the projection 73 on the lever 69 having a cam 74 is adapted to coöperate with a pin 75 on a part of the carbon holder for the carbon A, the cam 74 being inclined obliquely to the path of the projection 75, and both of the projections 72 and 73 are located adjacent to the end of the motion of their respective carbon holders so that should the carbon B reach the limit of its motion on the screw 18, it will coöperate with the projection 73 to tilt the lever 69 about its pivot 70, causing the arm 71 thereon to depress the spring arm 67 of the circuit controller, thereby disengaging it from the contact 68 and interrupting the current through the magnet 54 which serves to actuate the carbon feeding mechanism. On the other hand, should the carbon holder for the carbon A reach the limit of its motion, the pin 75 thereon will coöperate with the cam 74 on the lever 69, causing the projection 73 to be lifted and the lever tilted about its pivot 70, and the arm 71 in this case also being depressed, disengages the spring arm 67 and the contact 68 to interrupt the operation of the automatic feeding mechanism. The automatic feeding operation of the carbons may also be arrested manually whenever desired by operation of the handle 76, the latter being mounted to slide on the supporting sleeve 77 which may be conveniently fixed to the casing so as to surround the shaft extension 19 and sleeve 22, this handle being connected by the link 78 to a crank 79, the latter in turn being fixed to a rock shaft 80 journaled in the support 81 of the casing, and this rock shaft has a projection 82 thereon arranged to coöperate with the surface 83 of the lever 69 as a cam, so that by rotation of this rock shaft the projection 82 thereon coöperating with the cam surface 83 will serve to tilt the lever 69 to depress its arm 71, while when it is returned to normal position as shown in Fig. 2, the lever 69 occupies a position with the arm 71 thereof elevated and free from the spring arm 67 so that the latter may coöperate with the contact 68, and the operation of this rock shaft is accomplished by sliding the handle 76 along the sleeve 77.

The line wires from any suitable source of electric current supply are connected to the terminals or binding posts 84 and 85 respectively, a flexible conductor 86 leading from the terminal 85 to the binding screw 35 on the carbon holder for the carbon B, while a similar flexible conductor 87 connects the carbon holder for the carbon A with the winding of the solenoid 42, the conductor 88 connecting the opposite terminal of this solenoid to the terminal 84. The contact 68 is also connected to the terminal 85 through the conductor 89 while the conductor 90 leads from the terminal 84 to the regulator magnet 54 to the circuit controller 65. These connections are shown most clearly in Fig. 8, from which it will be observed that the carbon electrodes and the solenoid 42 are connected in the line circuit, while the regulator magnet 54 and the circuit controller 65 are in shunt therewith, and for the purpose of proportioning the strength of the current flowing through the regulator magnet of the shunt circuit relatively to that in the main circuit through the carbons, it is usually expedient to insert a resistance 95 in the shunt circuit, for in this way the resistance of this circuit may be adjusted without disturbing the winding of the regulator magnet.

In operating an electric lamp of the kind hereinbefore described, the line terminals are connected to the terminals 84 and 85 of the lamp, and by operating the carbon adjusting handles 20 and 23, either simultaneously with the clutch members in engagement or separately, the carbon electrodes A and B are brought together until their points touch, as shown in Fig. 7, the respective carbon feeding screws 3 and 18 being free to operate at this time independently of the automatic regulator for the reason that the pawl 45 and the latch 49 are out of engagement with the ratchet wheel 44 so that the latter will rotate freely in either direction. With the electrodes A and B in contact, the main circuit is completed through the conductor 86, carbon B, carbon A, conductor 87, solenoid 42, conductor 88, back to the binding posts 84, and as the winding of the solenoid 42 is proportioned relatively to the strength of the current which is capable of sustaining the arc between the electrodes, the short circuit thus established through the solenoid will cause a momentary excess of current to flow through it which will cause its armature 41 to be attracted with sufficient force to tilt the lever 37, the roller 39 thereon coöperating with the carbon A to swing it apart from the carbon B about the pivots 11 as a center, and as the carbons are thus separated, the current flowing across the gap will establish an arc and the resistance of this arc will maintain the current passing through it and the solenoid 42 at such a strength that the armature will hold the lever 37 in equilibrium, an increase in the gap of the arc due to the wasting away of the electrodes causing an increase in the resistance, and consequently a corresponding decrease in the strength of the current flowing through the solenoid that will permit the armature 41 to gradually move out of the solenoid and allow the lever 37 to tilt about its pivot and thus allow the carbon A to approach the carbon B, the tendency being to maintain the gap of the arc substantially constant. The constant wasting away of the carbon points, however, will reach such a point that the increased resistance of the arc will decrease the strength of current through the main circuit through the carbons and the solenoid, causing the current flowing through the regulator magnet 54 to increase sufficiently to cause the said magnet to attract its armature 55, and as this armature is depressed, the yoke 56 and link 57 connecting it to the arm 46 will cause a swinging motion to be imparted to the latter, and as this arm swings downwardly, the pawl 45 and the latch 49 will be disengaged automatically from their respective stops 51 and 53, permitting the pawl and latch to coöperate with the ratchet wheel 44, and the continued motion of the arm 46 will cause rotary motion to be imparted to the ratchet wheel 44. As the latter is connected directly to the feed screw 3 of the carbon A by means of the sleeve 21, and to the feed screw 18 of the carbon B through the sleeve 22, handles 20 and 23, and the clutch connecting them, through the shaft 15 and its extension 19, and the bevel gears 16 and 17, each actuation of the ratchet wheel will cause the electrodes through the operation of their respective feed screws to approach one another, one or more actuations serving to bring the carbon points sufficiently close to diminish the resistance between them to such a point that the strength of current through the regulator magnet is insufficient to attract its armature, and the strength of current flowing through the solenoid 42 is sufficient to operate the lever 37 to reëstablish the arc, the arm 67 of the circuit controller interrupting the shunt circuit momentarily each time the armature of the regulator attracts its armature to allow the latter to return to normal position under the action of its spring 59.

The regulator just described will operate automatically to compensate for the wasting away of the electrodes, and when the latter have become too short for further operation of the lamp, the carbon holder containing the shortest carbon will have moved sufficiently far to coöperate with its respective part on the lever 69 of the stop mechanism, the carbon holder of the carbon B coöperating with the projection 72 of the pin 75, or the carbon holder for carbon A coöperating with the cam 74 on the projection 73, as the case may be, and thus serving to tilt the lever 69 in such a way that its arm 71 will be depressed until it engages the spring arm 67 of the circuit controller or interrupter, moving it out of engagement with the contact 68 to interrupt the circuit through the regulator magnet 54 and thus prevent further feeding operation by the regulator. The carbon feeding operation may also be interrupted manually by sliding the handle 76 rearwardly on the sleeve 77, as this handle is connected by the link 78 and crank 79 to the rock shaft 80, and as the latter is rotated the projection 82 thereon will coöperate with the cam 83 on the lever 69, causing the latter to be tilted to break the shunt or regulator circuit through the spring arm 67 of the interrupter and the contact 68. The rearward movement of handle 76 is limited by a stop 76ª.

An electric lamp constructed in accordance with my invention is automatic or self-regulating in its operation with the result that the luminous arc between the carbons will give an illumination of substantially unvarying intensity, the regulator serving to feed the electrodes toward one another when the gap of the arc exceeds a given length by reason of the wasting action of the current, while the arc-controlling device serves to separate the electrodes when they are in contact or close proximity to one another to establish and maintain the arc, the variations in the resistance of the arc operating to modify the current through the solenoid of the controlling device so that the latter will automatically maintain the electrodes in the proper relative positions. The regulator is also automatically controlled by the resistance of the arc between the electrodes, an excessive resistance thereof due to the wasting away of the electrodes causing a current of sufficient strength to flow through the shunt or regulator circuit as will energize the regulator magnet with sufficient energy to attract its armature, operation of the latter causing the electrodes to be fed toward one another. Moreover, while the automatic regulator is capable of taking care of the lamp, the manually-controlled devices for operating the carbons enable the latter to be quickly set or adjusted by hand, the automatic regulator and the manually-controlled device coöperating in such a way with the carbon feed screws that the operation of one will not interfere with the other.

By arranging the lamp mechanism within the casing, there is no danger of the parts becoming disarranged, and as the handles for adjusting the carbons manually and for controlling the carbon feeding operation of the regulator are all mounted on the same axis and are located on the exterior of the casing, the operation of the lamp may be controlled conveniently without the necessity of obtaining access to the interior of the lamp or its surrounding casing which in the case of the projection apparatus are essential for light-excluding purposes.

I claim as my invention:

1. In an electric arc lamp, the combination with a pair of carbon holders, one of which is provided with a feed screw, of a ratchet wheel secured to said screw, a swinging member carrying a pawl to coöperate with the ratchet wheel when swung in one direction, a device coöperating with the pawl to hold the latter out of engagement with the ratchet when the swinging member is returned, a latch for locking the ratchet during such return movement, means for automatically releasing the latch when the pawl comes under the control of the holding device, and an electromagnet for operating the swinging member controlled by the current.

2. In an electric arc lamp, the combination with the carbon holders, independently operable feed screws for said holders arranged substantially at right angles to each other, and a shaft extending axially through one of the screws and operatively connected to the other screw, of operating handles both mounted axially of the said shaft one being connected to the latter and the other to the screw through which it passes, and a clutch for connecting and disconnecting said handles for simultaneous and independent operation, said clutch being controlled by an axial movement of one handle relatively to the other.

3. In an electric arc lamp, the combination with the carbon feeding devices, of a pair of operating handles operatively connected to the respective carbon feeding devices, one of the handles being movable relatively to the other, a spring for retaining the handles in coöperative relation for simultaneous operation and a detent for holding them disengaged for independent operation.

4. In an electric arc lamp, the combination with the carbon feeding devices, and rotatable extensions operatively connected to the respective feeding devices, of an operating handle on each extension, one of the handles being movable axially relatively to the other, a spring normally operating to hold the handles in coöperative relation, a detent arranged to engage the movable handle to retain it disengaged from the other handle, and a plunger adjacent to the handles for operating the detent.

5. In an electric arc lamp, the combination with the carbon holders for supporting the carbons in angular relation, one of the holders embodying a rigid body portion, a carbon-engaging portion having a pivotal connection with said body portion to permit a lateral movement of the corresponding carbon relatively to its axis, of an electro-magnet or solenoid connected in circuit with the carbons, and having an armature coöperating therewith, an arm operating to move the movable carbon laterally of its axis to vary the arc gap between the carbons, said arm having operative connection with the said armature and a spring operating to hold the pivotally mounted carbon in engagement with the arm.

6. In an electric arc lamp, the combination with the carbon holders, and feed devices for independently operating the holders to feed the carbons, of an electro-magnetically-operated regulator for operating the feed devices, an interrupter in circuit with the regulator, and devices controlled by the motion of either of the carbon holders for operating the said interrupter.

7. In an arc lamp, the combination with a pair of carbon holders, and feed devices for operating them, of an electromagnetic regulator for operating the feed devices, embodying an interrupter, an arm adapted to be operated by both feed devices to stop the operation of the interrupter, and manually operable means also adapted to act on the arm to stop the interrupter.

8. In an arc lamp, a pair of carbon holders and feed devices therefor independently operable, an electromagnetic regulator for operating the feed devices embodying the circuit interrupter, and a connection between both feed devices and the interrupter, whereby either device may operate the latter to stop the regulator.

9. In an electric arc lamp, the combination with the relatively-movable carbon holders, and the feed devices for operating them, of an automatic regulator for operating the feed devices, and a controller for the feed devices embodying a pivoted arm having a projection to engage one of the carbon holders, and a cam to coöperate with a part on the other holder, and an interrupter operated by the said arm to interrupt operation of the regulator.

10. In an electric arc lamp, the combination with the carbon holders and feed devices for operating them, of a regulator for operating the feed devices, an interrupter for controlling the operation of the regulator, a controlling arm operated by the movement of the carbon holders for operating the interrupter automatically to stop the carbon feed by the regulator, a manually operated handle, and a cam operated thereby for operating the controlling arm to interrupt the feeding operation of the regulator.

ERNST SAILER.

Witnesses:
CLARENCE A. BATEMAN,
G. WILLARD RICH.